United States Patent [19]

Hoppe et al.

[11] Patent Number: 5,515,488
[45] Date of Patent: May 7, 1996

[54] METHOD AND APPARATUS FOR CONCURRENT GRAPHICAL VISUALIZATION OF A DATABASE SEARCH AND ITS SEARCH HISTORY

[75] Inventors: Eric A. Hoppe, San Jose; Ramana B. Rao; Jock Mackinlay, Palo Alto, all of Calif.

[73] Assignee: Xerox Corporation, Stamford, Conn.

[21] Appl. No.: 297,996

[22] Filed: Aug. 30, 1994

[51] Int. Cl.⁶ .................................................. G06F 17/30
[52] U.S. Cl. ..................... 395/140; 395/155; 395/160; 395/161
[58] Field of Search .................... 395/155–161, 395/140, 600, 650; 364/419.01, 419.07, 419.19

[56] References Cited

U.S. PATENT DOCUMENTS

| | | | |
|---|---|---|---|
| 4,649,499 | 3/1987 | Sutton et al. | 364/518 |
| 5,021,976 | 6/1991 | Wexelblat et al. | 364/521 |
| 5,065,347 | 11/1991 | Pajak et al. | 395/159 |
| 5,333,254 | 7/1994 | Robertson | 395/155 |
| 5,339,390 | 8/1994 | Robertson et al. | 395/157 |
| 5,355,473 | 10/1994 | Au | 395/600 |

OTHER PUBLICATIONS

"XSoft Brings Document Management to PCs," The Seybold Report on Desktop Publishing, Apr. 4, 1994. vol. 8, No. 8, pp. 29–30.

Vizard, M., "Document Manager Taps Data Visualizer," PC Week, Apr. 18, 1994, pp. 63–64.

Furnas, G. W., "Generalized Fisheye Views," CHI '86 Proceedings, ACM, Apr. 1986, pp. 16–23.

Spoerri, A., "InfoCrystal: A visual tool for information retrieval," Center for Educational Computing Initiatives, M.I.T., Cambridge, Maryland, IEEE 1993, pp. 150–157.

Fairchild, K. M., Poltrock, S. E., and Furnas, G. W., "Sem-Net: Three–Dimensional Graphic Representation of Large Knowledge Bases, " in Guindon, R., Ed., Cognitive Science and its Application for Human Computer Interaction, Lawrence Erlbaum, Hillsdale, New Jersey, 1988, pp. 201–233.

Primary Examiner—Almis R. Jankus
Attorney, Agent, or Firm—Richard B. Domingo

[57] ABSTRACT

A computer controlled display system providing for graphical representation of a query to a database and creation and traversal through a search history. A database search is typically performed by a sequence of narrowing queries. Each narrowing query is performed in a query window. A query window is comprised of an input area for entering query expressions, an query results display area, an indicator of a search scope associated with the query window and a history indicator area. A suitable information visualization technique is used to graphically display the search results in the query results display area. From these visualizations, new search scopes and query windows are created. A search path comprising the query windows for the current search path are displayed at any instant of time of the search. A history mechanism provides for ready traversal through the search history.

18 Claims, 8 Drawing Sheets

METHOD AND APPARATUS FOR CONCURRENT GRAPHICAL VISUALIZATION OF A DATABASE SEARCH AND ITS SEARCH HISTORY

FIELD OF THE INVENTION

The present invention relates generally to the field of information visualization, and more particularly, graphical visualization of a database search.

BACKGROUND OF THE INVENTION

More and more information is being made available to computer system users via various mediums such as CD-ROMs, on-line databases and the like (collectively referred to as databases). A query to a database typically requires a complex textual specification based on keywords and logical relationships between sets of information. In most instances, the query returns only the results. Often, the results are not useful either because the results are much larger than that which can be easily visualized and manipulated, or because the result is unexpectedly empty.

When performing a search, it is typical that a search strategy will be used in order to find the desired information. Most search strategies are premised on attaining a reasonable number of items that satisfy a search criteria. Typically, a query is comprised of keywords (i.e. search terms) connected together via Logical and/or Proximity Operators. Logical Operators are used to include or exclude items in a set whereas proximity operators are used to identify items having keywords that are a predetermined distance apart (such as within 10 word or that are adjacent). Once a query is made and executed, a list of items satisfying the criteria of the query is presented to the user. The user can then either view one or more items in the list, or if the list is large, modify the search to reduce the number of items in the list.

One prior art system, the LEXIS Information retrieval system, allows queries to be performed according to various levels. Each subsequent level contains a subset of the results of the immediately prior level, based on user provided search criteria. The LEXIS system provides text based feedback which indicates the number of items found which satisfy the search criteria. The user then has various options to view the list of items found (e.g. full text, keyword in context, segments or as a list of citations.)

A second prior art system is the DIALOG information retrieval system. In DIALOG, query results can be structured so that feedback is provided as to the number of items found which satisfy each keyword. Queries may also be combined to create new queries. However, the user must track the queries made in order to make effective use of these facilities.

When performing searches, it may also be desirable to be able to restart searches at a point in the middle of a search path. In the aforementioned LEXIS System, this is accomplished by specifying and modifying a prior search level. This has the drawback in that it entirely replaces the prior search level and all search level below the level modified. In the Dialog system this can be done, but is left to the user to map out the query history according to the taken search sequence. No mechanism is provided to the user to accommodate this. Thus, it would be desirable to have a system that is capable of creating a search history through which a user may restart searches at designated points without destroying the results of any prior searching.

Further materials relevant to present invention include:

EP 0 535 986 A2, entitled "Method of Operating A Processor", Robertson, which is assigned to the assignee of the present invention describes a method for centering a selected node of a node link structure along a centering line. The nodes are in rows, and each row extends across a centering line with links between nodes in adjacent rows. When a user requests a centering operation for an indicated node, a sequence of images is presented, each including a row that appears to be a continuation of the row with the indicated node and that includes a continued indicated node that appears to be a continuation of the indicated node. The rows appear to be shifted, bringing the continued indicated nodes toward the centering line, until a final shift locks the continued indicated node into position at the centering line. The positions of the indicated node and a subset of the continued indicated nodes together can define an asymptotic path that begins at the position of the indicated node and approaches the center line asymptotically until the final shift occurs. The displacements between positions can follow a logarithmic function, with each displacement being a proportion of the distance from the preceding position to the centering line. Each node can be rectangular, and the nodes in each row can be separated by equal offsets to provide compact rows. Each node can be a selectable unit, so that the user can request a centering operation by selecting a node, such as with a mouse click.

EP 0447 095A, Robertson, et al., entitled "Workspace Display", which is assigned to the assignee of the present invention discloses a processor which presents a sequence of images of a workspace that is stretched to enable the user to view a part of a workspace in greater detail. The workspace includes a middle section and two peripheral sections that meet the middle section on opposite edges. Each of the sections appears to be a rectangular two-dimensional surface and they are perceptible in three dimensions. When the user is viewing the middle section as if it were parallel to the display screen surface, each peripheral section appears to extend away from the user at an angle from the edge of the middle section so that the peripheral sections occupy relatively little of the screen. When the user requests stretching, the middle section is stretched and the peripheral sections are compressed to accommodate the stretching. When the user requests destretching, the middle section is destretched and the peripheral sections are decompressed accordingly.

Furnas, G. W., "Generalized Fisheye Views," CHI '86 Proceedings, ACM, April 1986, pp. 16–23, describes fisheye views that provide a balance of local detail and global context. Section 1 discusses fisheye lenses that show places nearby in great detail while showing the whole world, showing remote regions in successively less detail; a caricature is the poster of the "New Yorker's View of the United States." Section 3 describes a degree of interest/DOI function that assigns to each point in a structure, a number telling how interested the user is in seeing that point, given the current task. A display can then be made by showing the most interesting points, as indicated by the DOI function. The fisheye view can achieve, for example, a logarithmically compressed display of a tree, as illustrated by FIG. 4 of Furnas for a tree structured text file. Section 4 also describes fisheye views for botanical taxonomies, legal codes, text outlines, a decisions tree, a telephone area code directory, a corporate directory, and UNIX file hierarchy listings. Section 5 indicates that a display-relevant notion of a priori importance can be defined for lists, trees, acylic directed graphs, general graphs, and Euclidean spaces, unlike the geographical example which inspired the metaphor of the "New Yorker's View," the underlying structures need not be spatial, nor need the output be graphic. FIG. 6 of Furnas shows a fisheye calendar.

Spoerri, Anselm, "InfoCrystal: A visual tool for information retrieval", MIT-CETI-TR 93-3, describes with reference to a FIG. 1, how to transform a Venn diagram into an iconic display which represents all possible Boolean queries involving its inputs in a normal form. The Venn diagram is first exploded into its disjoint subsets. The subsets are then represented by icons whose shapes reflect the number of criteria satisfied by their contents (also called the rank of a subset.) Finally, the subset icons are surround by a border area that contains criterion icons that represent the original sets. Visual coding principles that are incorporated include (1) shape coding to indicate the number of criteria that the contents associated with an interior icon satisfy, (2) proximity coding to indicate that the closer an interior icon is located to a criterion icon, the more likely it is that the icon's contents are related to it, (3) rank coding to indicate how many criteria are satisfied, (4) color or texture coding to indicate which particular criteria are satisfied by the icon's contents, (5) orientation coding so that the sides of an icon are positioned so that their sides face the criteria they satisfy, and (6) size or brightness & saturation coding to indicate the number of elements represented by an icon. Section 2.2 describes a Visual Query Language wherein the output of an InfoCrystal is defined as a set of selected interior icons. FIG. 3 illustrates how the InfoCrystals can be "chained together" to form a hierarchical query structure.

SUMMARY OF THE INVENTION

A computer controlled display system providing for graphical representation of a query to a database and creation and traversal through a search history is disclosed. In the present invention, the results of a query to a database are graphically displayed in a query window using a suitable information visualization technique. The information visualization causes the display of the query results as one or more disjoint and selectable graphical regions relative to a search scope (e.g. a Venn diagram situated on a plane). The query window is further comprised of an input area for entering query expressions, an indicator of a search scope associated with the query window and a history indicator area. The history indicator area contains icons identifying siblings within a search level. The query windows in a particular search path are displayed as concentrically nested to provide a visual cue as to the relationship of the query windows. Where a query window is in the nesting indicates it's level in the search history. The nesting further provides for easy traversal through that search path can be accomplished in a point and click fashion. New query windows are created by definition of a new search scope based on search results.

The present invention further provides a search history mechanism for facilitating traversal through the search history. One aspect of the search history mechanism is embodied in the history indicator areas in each of the query windows. The alignment of the query windows and their corresponding indicators reveal a branch of the search history. Traversal to particular points in the path is enabled by clicking on the an icon associated with the desired query window (or search scope). A second aspect of the search history mechanism is the provision of a history windows for displaying the search history in a tree format.

DETAILED DESCRIPTION OF THE PREFERRED EMBODIMENTS

A computer controlled display system for graphically displaying the results of a query to a database is disclosed. In the following description numerous specific details are set forth, such as the operational aspects of a database, in order to provide a thorough understanding of the present invention. It would be apparent, however, to one skilled in the art to practice the invention without such specific details. In other instances, specific implementation details, such as software coding techniques for creating graphical objects, have not been shown in detail in order not to unnecessarily obscure the present invention.

The term database as used herein refers to any body of information that is accessible via a computer based system. The body of information would typically be a database located on a storage medium directly connected to the computer based system (e.g. on a CD-ROM) or accessible via a network (e.g. an on-line information source). Alternatively, the body of information could be a collection of documents or document parts managed by a document management system. In any event, such databases can be characterized as having three primary parts: the information or data itself, a retrieval/updating part and a user interface part. The retrieval/updating part enables access to the information for retrieval, editing, or addition of information. The user interface part is the mechanism by which a user interacts with the database to search for and obtain information. It is this user interface part to which the present invention is directed.

As used herein, the term search refers to the steps performed for retrieval of information from a database. The term document refers to the specific items of information contained in the database. Documents include textual, audio or visual works. The term search scope refers to the set of information in the database which may be retrieved at any instant during the search. As will become apparent in the foregoing description, a search scope is created through selection of subsets of the results of a query. The search scope is narrowed as the various queries in the search are performed. The term query refers to a set of parameters provided for executing a step in a search. This set of parameters is typically in the form of one or more expressions. Expressions are predicates such as keywords or sets of keywords, dates, numbers and other data types, as well as various combination thereof, combined with logical or proximity operators which define the documents of interest.

Figure 1:
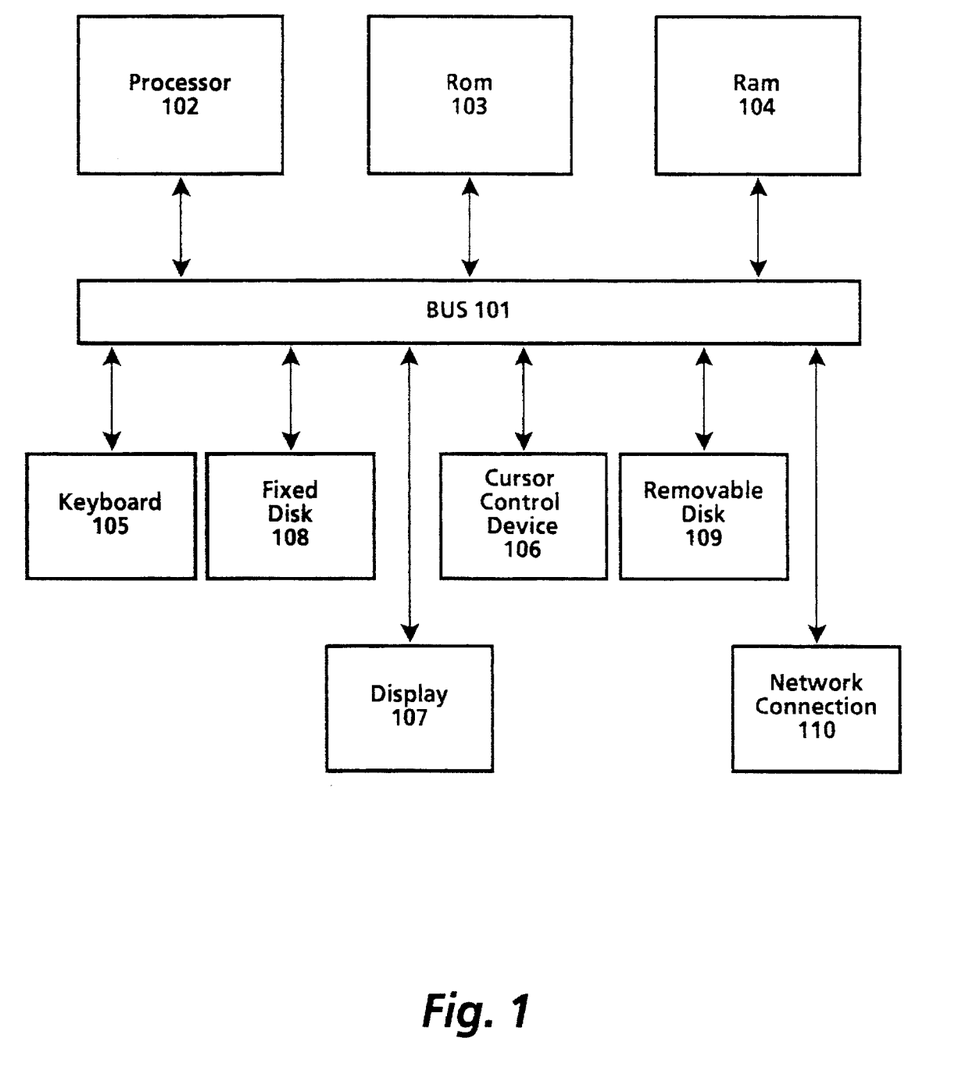
FIG. 1 is a block diagram of a computer based system upon which the currently preferred embodiment of the present invention may be implemented.

Overview of a Computer Based System In the Currently Preferred Embodiment of the Present Invention The computer based system on which the currently preferred embodiment of the present invention may be implemented is described with reference to FIG. 1. Referring to FIG. 1, the computer based system is comprised of a plurality of components coupled via a bus 101. The bus 101 illustrated here is simplified in order not to obscure the present invention. The bus 101 may consist of a plurality of parallel buses (e.g. address, data and status buses) as well as a hierarchy of buses (e.g. a processor bus, a local bus and an I/O bus). In any event, the computer system is further comprised of a processor 102 for executing instructions provided via bus 101 from either static Read Only Memory (ROM) 103 or dynamic Random Access Memory (RAM) 104. The processor 102, ROM 103 and RAM 104 may be discrete components or a single integrated device such as an Application Specification Integrated Circuit (ASIC).

It should further be noted that the processor 102 is used to execute instructions coded in a suitable programming language for creating the graphical data used to create the query and history windows and the various visualizations described herein. The processor 102 would also process the queries associated with a database search. Moreover, such instructions would be used for causing the steps outlined in FIG. 2 to be performed.

Also coupled to the bus 101 are a keyboard 105 for entering alphanumeric input, a cursor control device 106 for manipulating a cursor, a display 107 for displaying visual output, and a fixed disk 108 for storing data (e.g. the database). The fixed disk 108 may be a magnetic or optical disk. Further coupled to the bus 101 is a removable disk 109 and a network connection 110. The removable disk 109 may be a floppy disk drive, or an optical disk drive such as a CD-ROM drive which itself may be a database). The network connection 110 represents either a local area network coupling or a public network coupling. In any event, the network connection 110 provides for coupling to databases residing on the network.

The representation of the results of a query will be displayed on display 107 and the user will interact with the computer controlled based system through a combination of the keyboard 105 and the cursor control device 106.

While the preferred embodiment of the present invention is embodied on a computer based system, the present invention could be practiced on any computer controlled display system, such as a fixed function terminal. The currently preferred embodiment of the present invention is implemented on a computer controlled display system having a Graphical User Interface (GUI) which allows multiple concurrent "windows" to be in operation (e.g. one of the family of Macintosh Computers available from Apple Computer, Inc. of Cupertino Calif.). A "window" refers to a visual representation of an executing task. Windows and operation thereof is well known in the art, so no further discussion of windows or their operation is deemed necessary. Such a GUI will also support operations such as "point and click". A "point and click" operation is one where a cursor on a display screen is positioned over a desired portion of the display, such as an icon, using a cursor control device such as a mouse or trackball. Once the cursor is appropriately positioned, a button/switch associated with the cursor control device is quickly depressed and released. This creates an electrical signal which causes a predetermined operation to occur. Other operations may require a "double click" where the button/switch is depressed and released rapidly, twice in succession.

Operational Flow and Creation of a Search History

Figure 2:
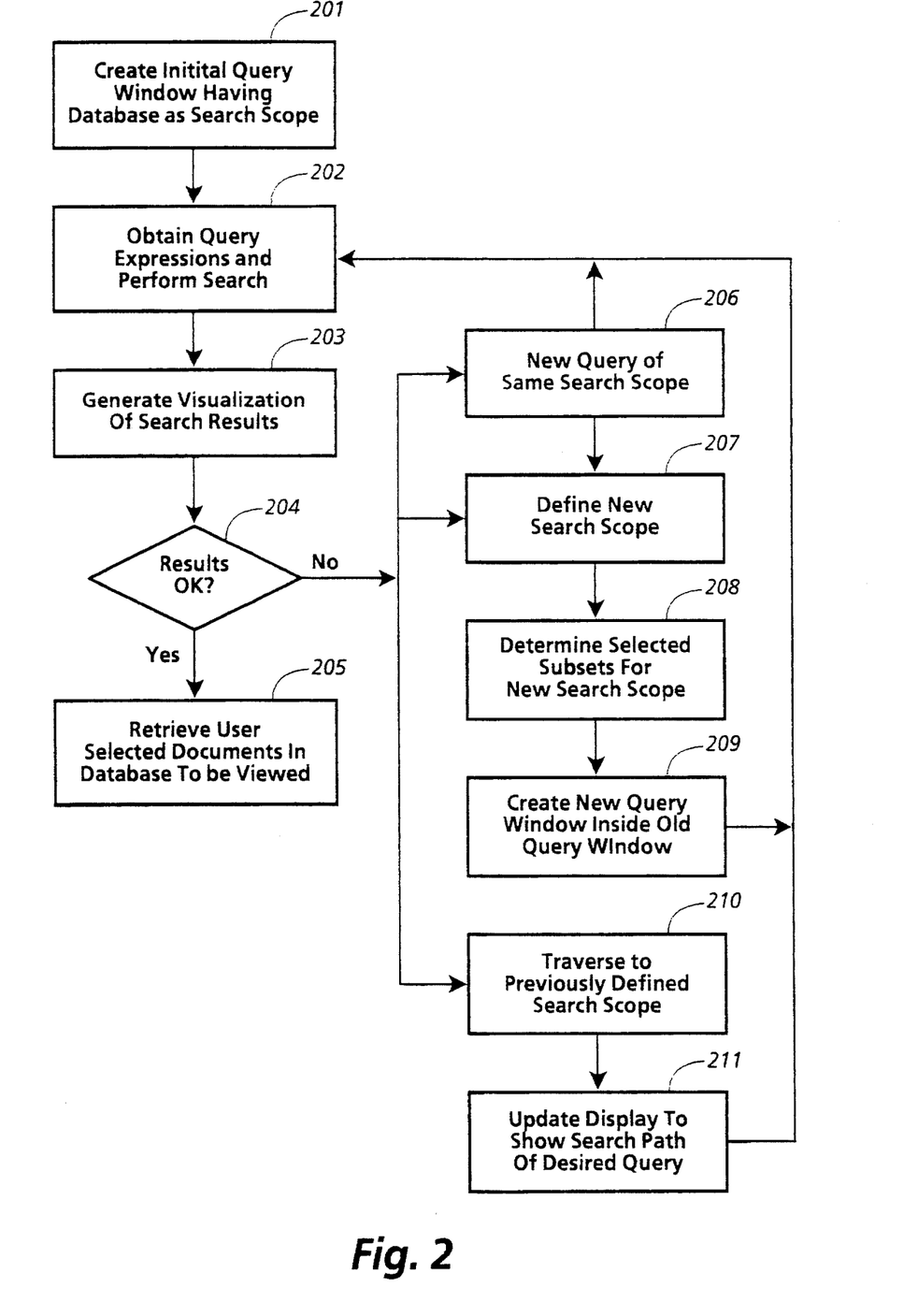
FIG. 2 is a flowchart illustrating the basic steps in a database search which result in the creation of query windows and a search history tree, as may be performed in the currently preferred embodiment of the present invention.
Figure 3:
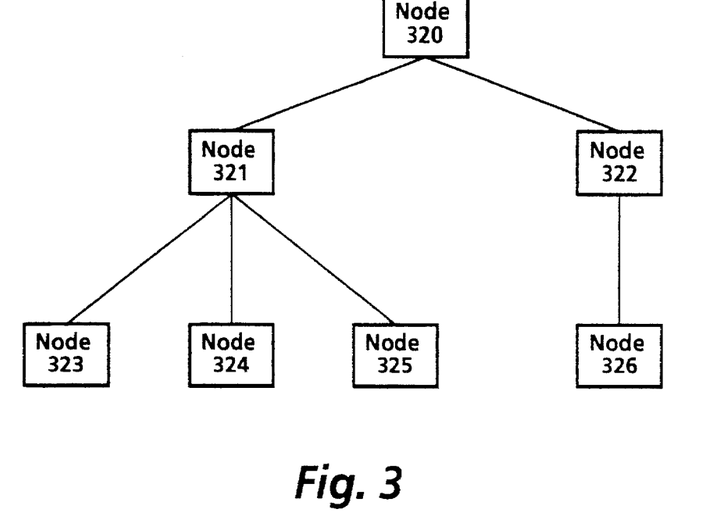
FIG. 3 is an example of a search history tree as may be created in the present invention.

FIG. 2 is a flowchart illustrating the basic steps of performing a search and the resulting creation of the history tree structure in the currently preferred embodiment. Accordingly, certain steps, such as selection of the desired visualization for the search results, are not described. Referring to FIG. 2, a query window is created having the entire database as a search scope, step 201. Referring briefly to FIG. 3, this is represented as root node 320. Referring back to FIG. 2, a search is then performed based on one or more search expressions, step 202. The search expressions provided would be according to the search rules of the particular data retrieval mechanism associated with the database. For example, if the database was based on a relational database, the search expressions would be based on relationships between elements of known categories of data. The query will be processed, the desired visualization determined and a graphical visualization of the search results is displayed in the query window, step 203. As the present invention may incorporate various visualization techniques, the user will have selected the desired visualization either before or after execution of the query. Alternatively, the visualization may be automatically selected based on the query. In any event, a user must then determine if they are satisfied with the search results (i.e. the results are o.k.), step 204. If they are satisfied, the search to this point is completed and the user would select documents which would be retrieved for viewing, step 205. If they are not satisfied, the user must then formulate a subsequent search strategy. The options are to formulate a new query with the same search scope, step 206, create a new search scope, step 207 or to traverse back to a prior search scope, step 210. For the option of formulating a new query to the same search scope, the query is obtained and the search performed per step 202. For the option of defining a new search scope, the user selects the new search scope from the results of the last executed query. As will be explained in greater detail below, this will typically be done by a point and click operation on the visualization of the search results within the query window. The subsets of the search results are determined, step 208 and a new query window is created inside the previous query window, step 209. This creating within a prior query window causes a "concentric nesting" of the query windows to provide a visual cue as to the relationship of the windows. Once the new search scope is created, queries are executed per step 202. Referring briefly to FIG. 3, this step is performed for creation for all the nodes except the root node 320.

If the user decides to traverse back to a previously defined search scope per step 210, the user must select the desired search scope. As will become apparent in the description below, the present invention provides two ways to accomplish this, via the history indicators in the query window of the concurrently displayed query windows or via the history structure displayed in the history window. In any event, once the desired search scope is selected, the display is updated to present the query windows corresponding to the path of the selected search scope, step 211. New queries would then be executed, per step 202, based on the selected search scope.

Referring back to FIG. 3, it is presumed that the steps described in FIG. 2 are used to add the nodes 321–326. It should be noted that the nodes 321 and 322 are on the same level and have the same parent node. The nodes 323–326 are on the same level but the nodes 323–325 have a different parent than node 326. Thus, nodes 323–325 are said to be on different search paths than node 326. As will be described below, when displaying a search path, the query window for a node for each level in the path is displayed.

Query Windows

Figure 4:
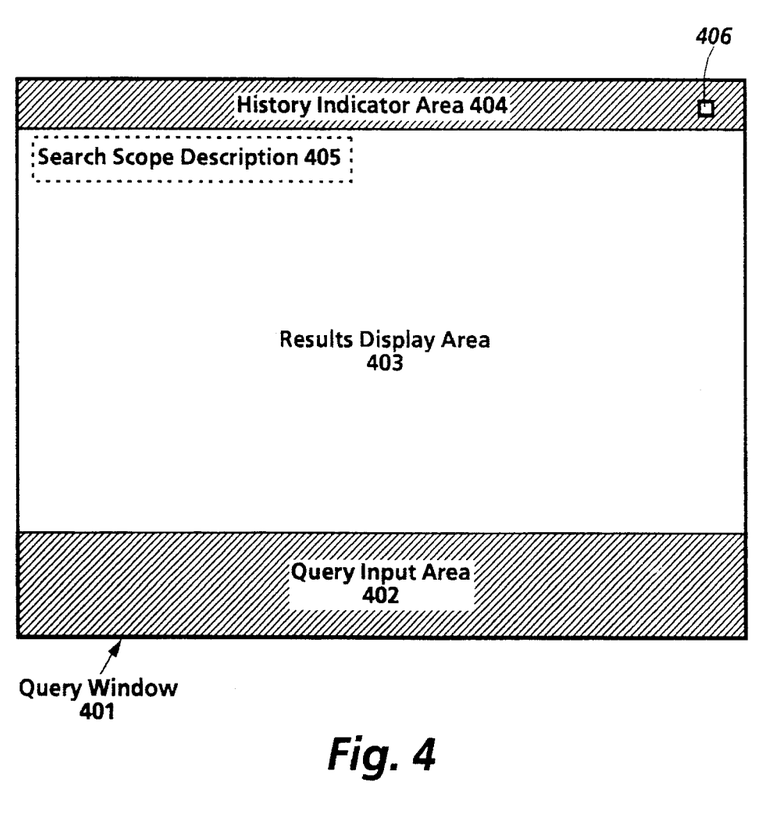
FIG. 4 illustrates a query window as may be utilized by the currently preferred embodiment of the present invention.

The structure of a query window in the currently preferred embodiment is illustrated with respect to FIG. 4. The term query window is meant to refer to the elements of the visual interface and does not limit the spirit and scope of the present invention. Examples of different implementations of a query window are provided in the description of the visual representation of query results provided below. Referring to FIG. 4, a query window 401 has a query input area 402, a results display area 403 and a history indicator area 404. The query input area 402 is where a user inputs a query. As described above a query is comprised of one or more expressions. The composition of the query input area will depend on the type of visualization desired.

The results display area 403 will display a graphical visualization of the search results according to a selected information visualization technique. Visualizations such as venn diagrams, a perspective wall, a hierarchical representation, lists, or tables, may be utilized. The key criteria for a graphical visualization is that the results are presented as selectable disjoint subsets. The manner in which selection occurs will depend on the graphical visualization used. Examples of such visualizations and a corresponding selection technique are described in greater detail below.

Also present in the results display area 403 is a search scope description 405 for the query window. The search scope description 405 is typically a textual description of the search scope of the query window (e.g. a logical organization of the expressions used to achieve the search scope.)

The history indicator area 404 provides a means by which a user may visually determine a location within a hierarchical search path. The history indicator will contain a number of indicators representing different created search paths at the same search level. The indicators used may be an icon or text symbol(s). The indicator(s) representing the search scope being displayed (and the search path) are highlighted. Here, an icon 406 (a box) is displayed to indicate that there is one search scope defined at this level. Multiple icons may be present. Each icon in the history indicator area 404 corresponds to a search scope.

Variations of the placement of the described areas are within the scope of the present invention. For example, the history indicator area may run down a vertical side of the query window. This may be desirable if the history structure used in a history window was displayed with a horizontal orientation (rather than vertical orientation of FIG. 3.) In such a case, the levels of the tree would naturally be in columns rather than rows. As a result, it would be more consistent with the history structure to have the icons displayed with a vertical orientation. Moreover, each of the various areas may be implemented as separate "windows". This would enable flexibility in the display of the query window. For example, it may be desirable at some point to remove a query input area when further query input is not needed.

Figure 5A:
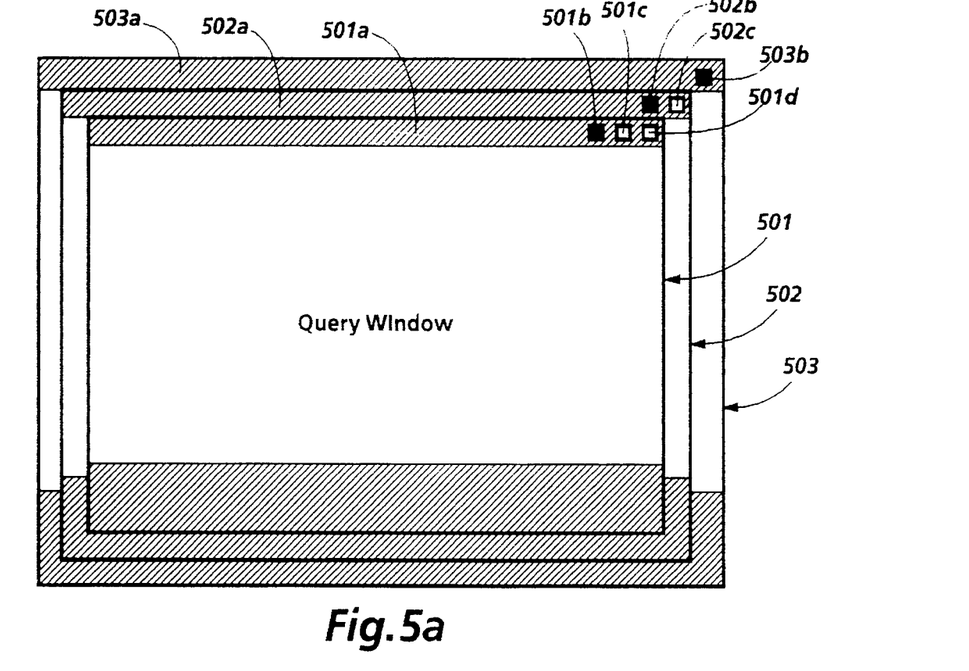
FIG. 5a illustrates a first configuration of nested query windows illustrating a first search path of the search history tree of FIG. 3, as may be utilized by the currently preferred embodiment of the present invention.
Figure 5B:
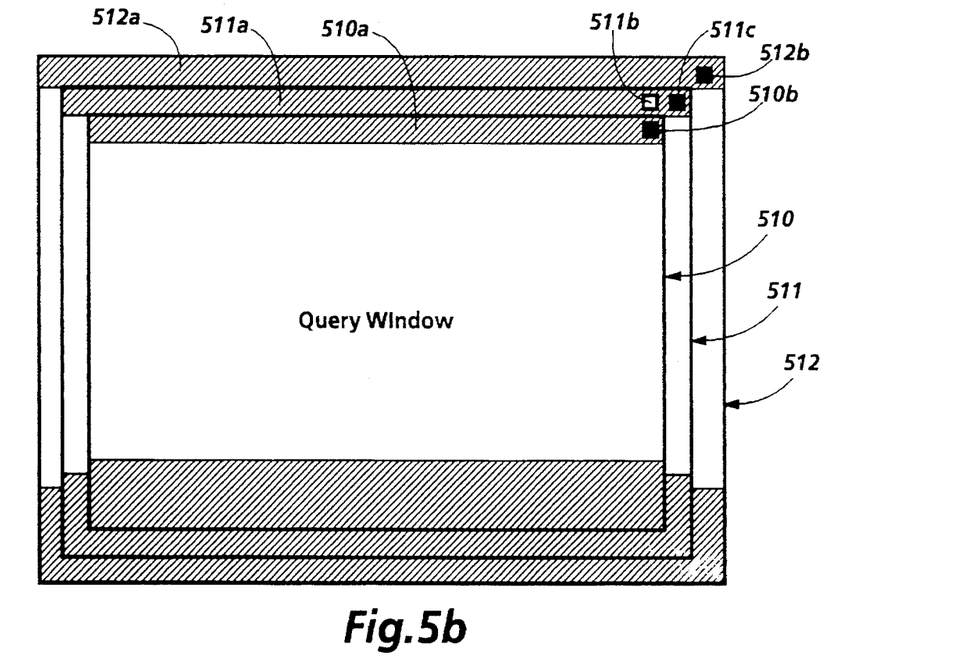
FIG. 5b illustrates a second configuration of nested query windows illustrating a second search path of the search history tree of FIG. 3, as may be utilized by the currently preferred embodiment of the present invention.

As noted above, during the course of a database search, query windows corresponding to a direct search path are displayed in a nested concentric fashion. This is illustrated with reference to FIGS. 5a and 5b. FIGS. 5a and 5b illustrate two search paths taken within the history structure of FIG. 3. Referring to FIG. 5a a plurality of query windows are displayed. There is a single query window displayed for each level in the search path. Only the query windows in the direct search path are displayed. However, the history indicator area is used to indicate the number of "sibling" nodes along search path that are on the same level. In FIG. 5a three query windows are displayed. Query window 501 corresponds to the search scope of node 323, query window 502 corresponds to the search scope of node 321 and query window 503 corresponds to the search scope of node 320. For query window 501 there are three nodes in the search path at that level. This is indicated by the three boxes/ 501b–501d) in the history indicator area 501a of query window 501. Note that the box 501b is highlighted to indicate the direct search path at this level of the tree. Moreover at this point it indicates where this query window is in the history structure. Similarly with respect to query window 502, history indicator area 502a is comprised of boxes 502b–502c. The box 502b is highlighted to indicate the direct path for the search scope of query window 501.

Referring now to FIG. 5b, again three windows 510–512 are displayed and correspond to the three levels of the tree structure. Query window 510 corresponds to the search scope of node 326, query window 511 corresponds to the search scope of node 322 and query window 512 corresponds to the search scope of node 326. For query window 510 there is only one node at that level of the search path so there is only one box 510b in history indicator area 510a. For query window 511, there are two nodes at that level of the search path, indicated by boxes 511b–511c of history area 511a. In this case, the box 511c is in the search path, so it is highlighted. Finally, the box 512b of the history area 512a is highlighted since it is in the search path.

Figure 5C:
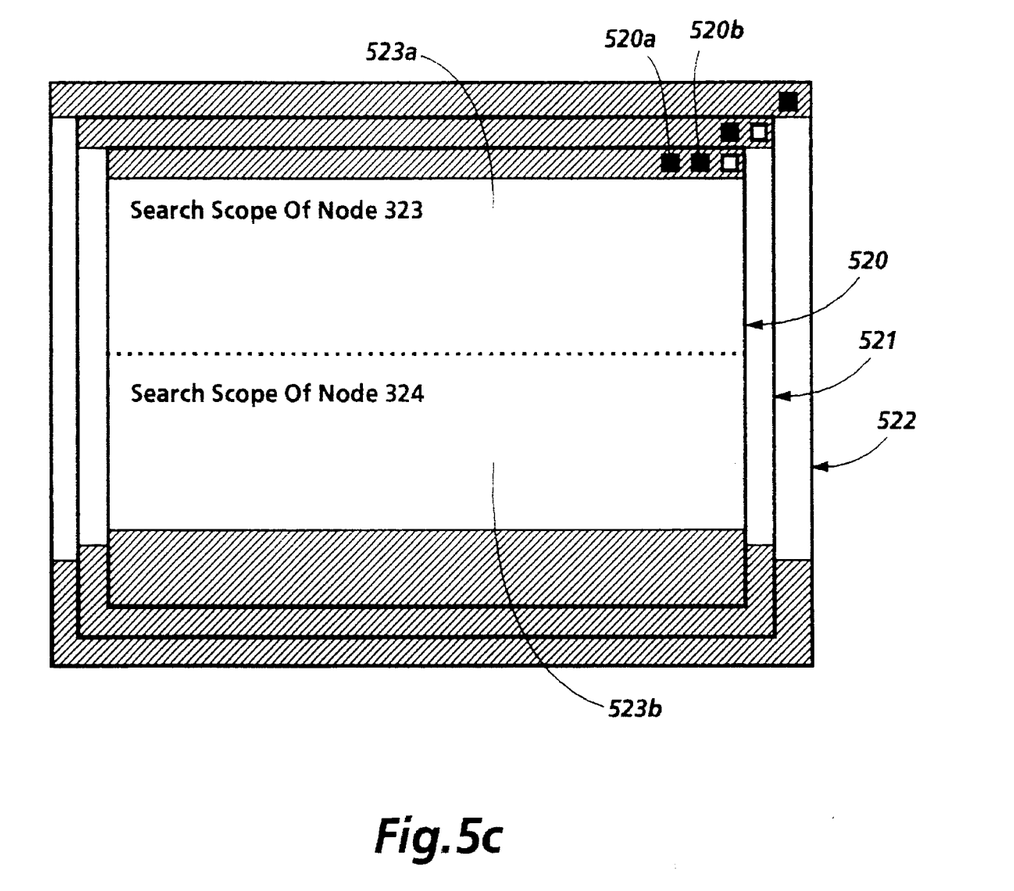
FIG. 5c illustrates a third configuration of nested query windows illustrating a third search path and said first search path of the search history of FIG. 3 displayed in the same query window, as may be utilized by the currently preferred embodiment of the present invention.

FIG. 5c illustrates windows 520–522 which correspond to the three levels of the tree structure. Query window 520 corresponds to the search scope of nodes 323 and 324, query window 521 corresponds to the search scope of node 321 and query window 522 corresponds to the search scope of node 320. Here, two search scopes at the same level are concurrently displayed. This is indicated by the highlighting of the boxes 520a and 520b. The results display area of query window 520 is divided into areas 523a and 523b each corresponding to a search scope. Such a display may be used for executing a query against both search scopes simultaneously.

History Window

The present invention combines the graphic visual representation of the results of a query with a means for maintaining and traversing a search history. The search history is used in the event that subsequent queries do not provide the desired results and it is desirable to restart at a convenient starting point. The search history in the currently preferred embodiment is generated in a hierarchical tree structure wherein each node represents a search scope. In this structure, a child node will represent a subset of the scope of the parent node. A user determines when a new search scope and resulting node is created. The entire search history is presented in a history window.

Figure 6:
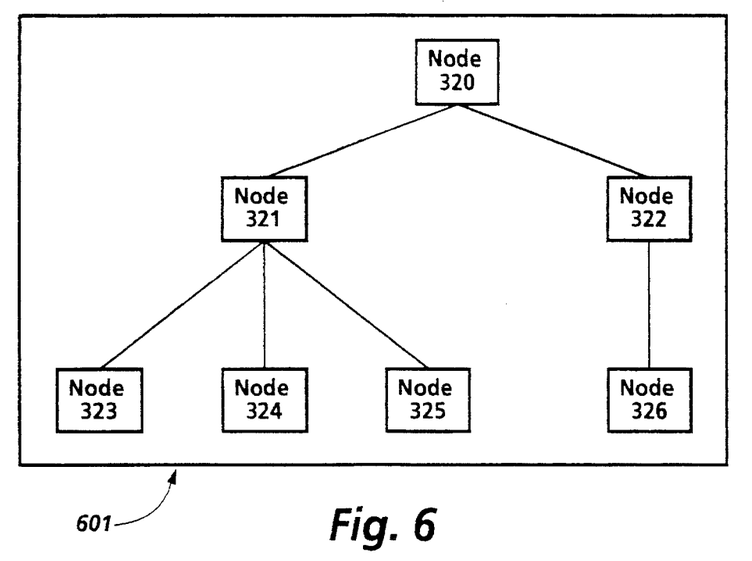
FIG. 6 illustrates a history window displaying the search history tree of FIG. 3, as may be utilized by the currently preferred embodiment of the present invention.

The history window is independent of the query windows. A history window is illustrated in FIG. 6. Referring to FIG. 6, the tree structure of FIG. 3 is shown on history window 601. The present invention provides for direct movement to the various query windows from the history window. This is done in a point and click fashion. By pointing to the node representing the desired query window and clicking on the cursor control button, the desired query window can be displayed to the user. Other functions such as deleting query windows can be performed form the history tree.

Techniques for graphical creation, representation and manipulation of tree structures are known in the art. Any such techniques could be implemented for use with the present invention.

Visual Representation of Query Results

The present invention provides a graphical display output which allows a user to visualize the results of a query to a database beyond a mere list format. Query results are graphically presented as selectable disjoint subsets. Two visualizations described below are the venn diagram and the perspective wall. A user may choose which visualization is used in connection with a particular query window, or the visualization may be selected automatically based on the query. Alternatively, a user may wish to have the same query results displayed using the various visualization techniques. Choosing which visualization to use may occur either before or after the query is executed. Each of these visualizations and a corresponding query window are now described.

Venn Diagrams

A Venn diagram uses circles to represent sets of data. Position and overlap of the circles indicate logical relationships between the sets of data. A Venn diagram based visualization is premised on the number of dimensions supported by the computer controlled display system. This is because no more than n+1 mutually intersecting sets may be readily displayed in n-space. So for example if the computer controlled display system generates graphical information in an n=2 space, (i.e. two dimensions) the number of sets or expressions that may be visualized is limited to three. Naturally, if n=3, up to 4 expressions or sets may be utilized. The currently preferred embodiment illustrates the case of n=2. However, this does not limit the number of expressions that can be used for a search since queries can be nested.

Figure 7:
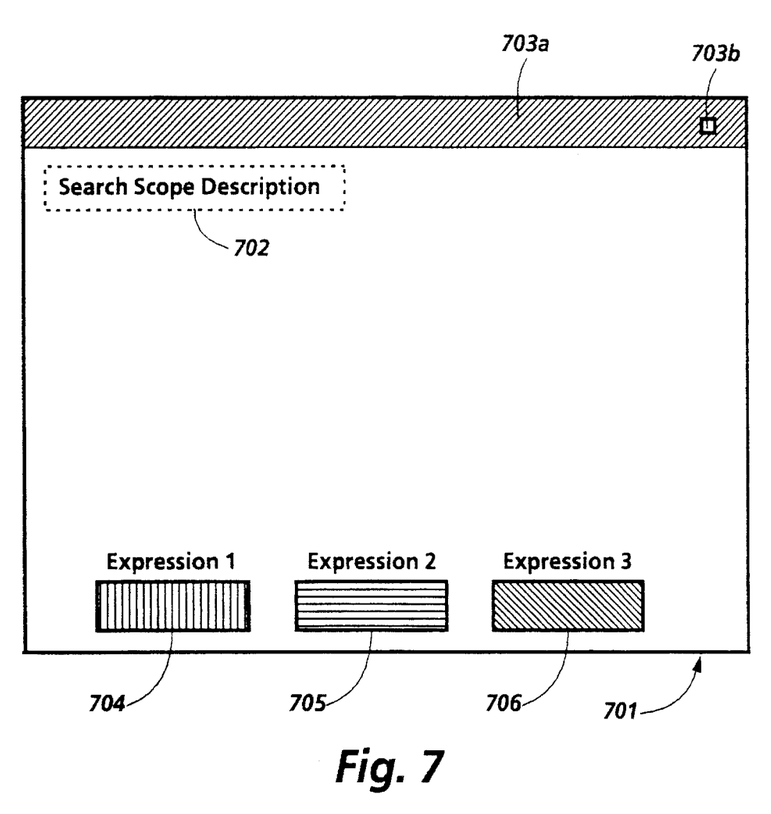
FIG. 7 illustrates a venn diagram visualization for a query window as may be used the currently preferred embodiment of the present invention.
Figure 8:
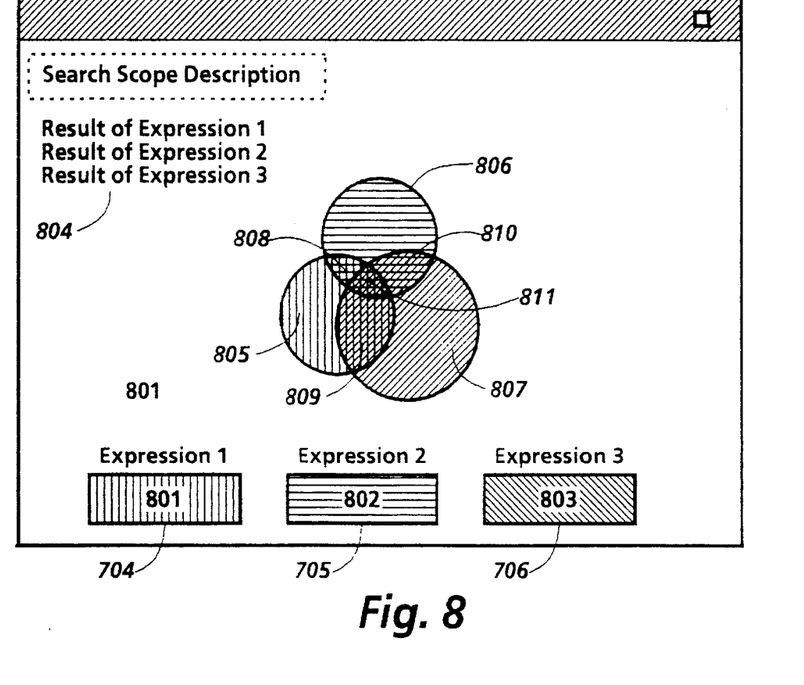
FIG. 8 illustrates the query window of FIG. 7 after an executed query showing a graphical visualization of the query results using a venn diagram
Figure 9:
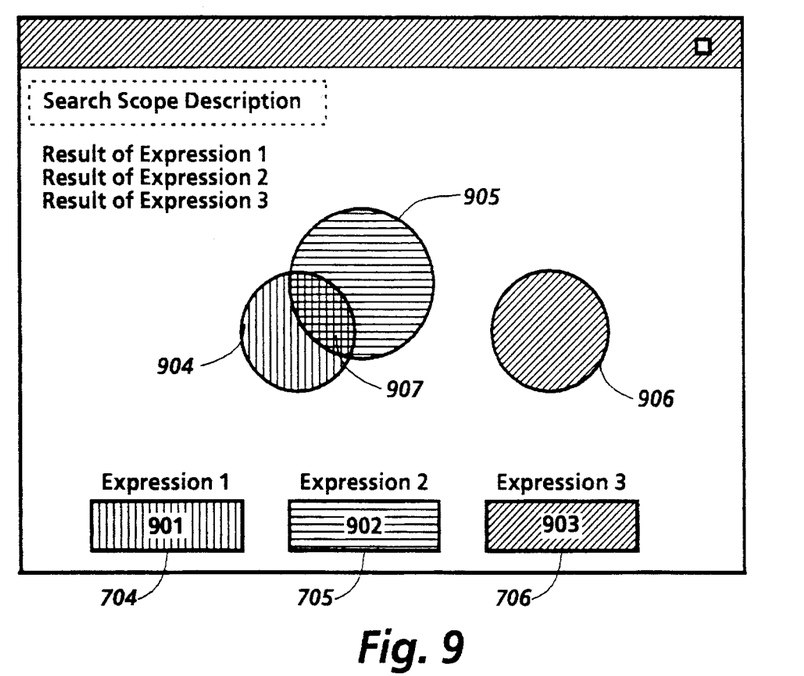
FIG. 9 illustrates an update of the query window of FIG. 7 after an executed query showing a graphical visualization of the query results using a venn diagram where one expression of the query has no elements in common with the other expressions.

Query windows embodying a venn diagram implementation are illustrated in FIGS. 7–9. The creation of the query windows illustrated in FIGS. 7–9 may be done utilizing programming tools or toolkits generally available to application program developers. FIG. 7 illustrates a query window prior to a query being made. Referring to FIG. 7, a query window 701 includes a description of the search scope 702 and a plurality of query input areas 704–706. It should be noted that each of the query input areas 704–706 has a different visually distinctive attribute. This visually distinctive attribute may be a color or a fill pattern. In FIG. 7, the query input area 704 has a vertical lines fill pattern, the query input area 705 has a horizontal lines fill pattern and the query input area 706 has a right slanted lines fill pattern. Because each of these queries is visually distinctive, the results of the various expressions in a query may be readily determined. Finally, the query window 701 includes history indicator area 703a. The history indicator area 703a is used to indicate a location (i.e. level) in the query history. The visual appearance of box(es) (e.g. box 703b) displayed the history indicator area 703a will also be an indicator of whether the corresponding search scope is in the current path of a query.

When querying the database, a user will enter expressions of the query into query input areas 704–705. The query would then be executed using a mechanism such as depressing the enter or return key of a keyboard coupled to the computer controlled display system, via a menu item, or via some switch or button (e.g. an execute button invoked by a point and click function) in the query window itself. FIG. 8 is a screen display illustrating the results of a query. Referring to FIG. 8, first, second and third search expressions 801–803 have been entered into query input areas 704–706, respectively. As a result of executing the query, a textual description of the results of the query for each of the expressions 804, is provided. This may include the actual number of elements responsive to the search query.

Further included in the query window is a results display area displaying a Venn diagram. In FIG. 8, the Venn diagram includes circles 805–807, which correspond to the results of search expressions 801–803, respectively. The number of documents satisfying the search expression of the corresponding circle is indicated by its size, by a number contained in the circle, or both. Each of the circles may also contain a list of or some iconic representation of the documents satisfying the corresponding search expression. It is significant to note that the resultant circles of the Venn diagram has the same fill pattern as found in the corresponding query input area. This allows a quick visual interpretation of how the query expressions relate.

The disjoint selectable subsets of the venn diagram visualization are further illustrated in FIG. 8. Note that overlap area 808 indicates the intersection of circles 805 and 806, the overlap area 809 indicates the intersection of circles 805 and 807, the overlap area 810 indicates the intersection of circles 806 and 807, and the overlap area 811 indicates the intersection of each of the circles 805–807. Each of the areas of the circles that do not overlap another circle are exclusive from the other circles (i.e. there are no common results). Each of these areas, as well as an entire circle, would constitute a selectable disjoint subset.

FIG. 9 illustrates the results of a different query. Referring to FIG. 9, a set of expressions 901–903 are entered into the query input areas 704–706 respectively. The resulting circles 904–906 of the Venn diagram correspond to the expressions 901–903 From the resulting Venn diagram in FIG. 9, it can be readily observed that no items in the database in circle 906 are in any of the other circles. This could be a desired or undesired result. In any event, it is clear that the relationships of the results between the different expressions can be quickly ascertained.

In FIG. 9 the disjoint subsets are the overlap area 907, the portion of circle 904 that does not overlap with circle 905, the entire circle 904, the portion of circle 905 that does not overlap with circle 904, the entire circle 905 and the entire circle 906.

Selection of a new search scope is a straightforward task. A user would simply point and click to the disjoint subsets in the results display to include those items are included in the new search scope. Selection of each of the overlap areas would be for the items satisfying the logical relationship indicated by the overlaps. Selection techniques for getting either all of what is in a particular circle, or the part of a circle not overlapping with another circle would be relatively straightforward. For example, a double click in a non-overlapping portion of a circle could be used to indicate selection of the entire circle, whereas a single click could indicate only the portion of the circle that does not overlap with another circle.

Perspective Wall

Figure 10:
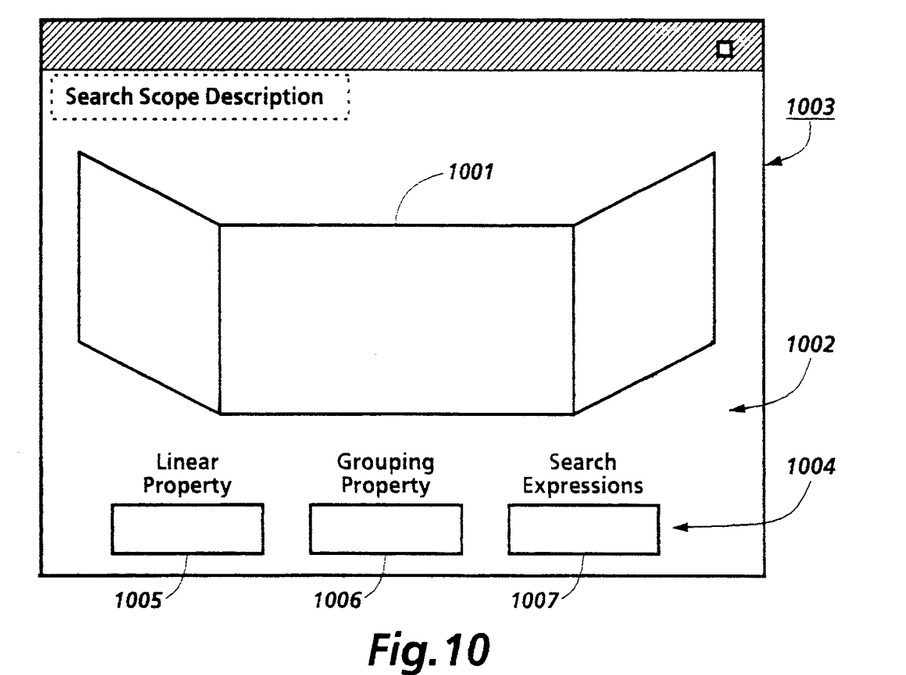
FIG. 10 illustrates a perspective wall implementation of a query window in the currently preferred embodiment of the present invention.

The perspective wall visualization permits a user to lay out search results along a linear property, such as date or version. The perspective wall is described in EP 0447 095A, Robertson, et al., entitled "Workspace Display". In the perspective wall visualization, database search results are organized along two user defined axes. So for example, a user may select date as a horizontal axes and author as a vertical axes. Items associated with a particular author are then laid out along the wall in time order. A query window for the perspective wall visualization is illustrated in FIG. 10. Referring to FIG. 10, the results of a query are organized onto perspective wall 1001 in the result display area 1002 of query window 1003. The results of a query are mapped to the wall according to user provided criteria (defined below). Traversal along the wall is invoked by scrolling to different parts of the wall or by "stretching" and "destreching" which is described in EP 0447 095A. The input area 1004 is different in that the intent of the perspective wall visualization is to filter out portions of the search scope and then organize along a linear property. So a first input box 1005, labeled linear property, is for identifying a property of the search scope to which the subsequent search results are laid out. This can be though of as the horizontal axis property. A second input box 1006, labeled grouping property, is for identifying a property of the search results by which the data linearly grouped. This can be through of a vertical axis property. A third input box 1007 is for providing one or more search expressions.

Figure 11:
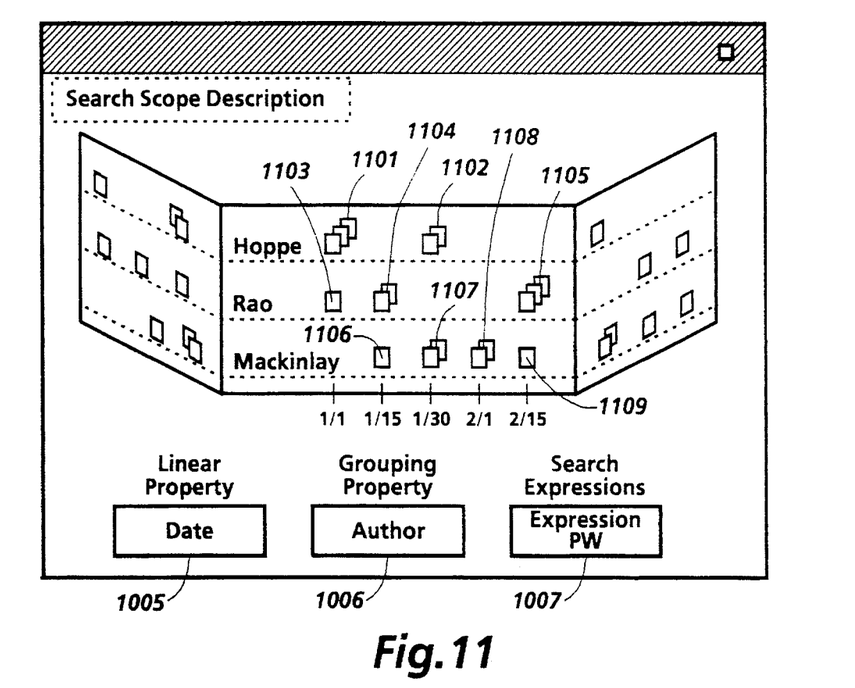
FIG. 11 illustrates the query window of FIG. 10 after an executed query showing a graphical visualization of the query results using a perspective wall.

FIG. 11 is an example of a perspective wall visualization. Referring to FIG. 11, the wall is comprised of a plurality of results laid out on the wall in a time and author fashion. Note that in the first input box 1005, the property "date" has been entered and in second input box 1006, the grouping property "author" has been entered. An expression "expression PW" has been entered into the third input box. On the perspective wall visualization, the documents satisfying the query criteria for authors "Hoppe", "Rao" and "Mackinlay" are laid out accordingly in time fashion. For the author "Hoppe" there are three documents dated Jan. 1 (as indicated at 1101) and two documents dated Jan. 30 (as indicated at 1102). The visualization indicates that there are other documents associated with the author "Hoppe", but the perspective wall must be traversed to get detail on those documents.

For the author "Rao", a single document is dated Jan. 1 (as indicated at 1103), two documents dated Jan. 15 (as indicated at 1104) and three documents dated Feb. 15 (as indicated at 1105). The visualization indicates that there are other documents associated with the author "Rao", but the perspective wall must be traversed to get detail on those documents.

For the author "Mackinlay", a single document is dated Jan. 15 (as indicated by 1106), two documents are dated Jan. 30 (as indicated by 1107), two documents are dated Feb. 1 (as indicated by 1108) and a single document is dated Feb. 15 (as indicated by 1109). The visualization indicates that there are other documents associated with the author "Mackinlay", but the perspective wall must be traversed to get detail on those documents.

For the perspective wall visualization, the disjoint subsets would be the space between two points along the defined linear property, or the collection of documents satisfying one of the grouping properties or a collection of documents satisfying one of the grouping properties and is between two points along the defined linear property. Selection of a disjoint subsets to create a new search scope can be accomplished by a point and click operation at a start point on the wall and a point and click operation at and end point on the wall (e.g. between two dates). Of course, the user may traverse the wall to get to the desired start and end points. All the search results between the two dates would then be part of a new search scope. Selection may also be performed on a group. A group may be selected by a point and click operation on a label identifying that group. Finally, selection can be performed on a group(s) but for only those documents between two points on the wall. This may be accomplished by "double-clicking" on the desired group and then single clicking for the start and end points on the wall.

Thus, a computer controlled display system providing for graphical representation of a query to a database and creation and traversal through a search history is disclosed. While the embodiments disclosed herein are preferred, it will be appreciate from this teaching that various alternative, modifications, variations or improvements therein may be made by those skilled in the art, which are intended to be encompassed by the following claims.

What is claimed:

1. A computer controlled display system for displaying the results of a search for documents stored in a database, said computer controlled display system comprising:

a display for displaying a plurality of query windows;

means for defining a search scope;

means for generating a query window responsive to definition of a search scope, said query window comprising an input area for input of query expressions, a query results area for graphical display of query results, a history indicator area for displaying one or more search scope indicators, and a search scope area for indicating the search scope for the query window, said means for generating a query window coupled to said display;

means for entering a query to said database, said query comprised of one or more expressions;

query processing means for processing query expressions from said input areas of said query window and causing display of the results of said query according to a user selected information visualization technique, said user selected information visualization technique causing display of a set of query results as a plurality of selectable disjoint subsets in said query results area, said query processing means coupled to said means for generating a query window.

2. The computer controlled display system as recited in claim 1 wherein said one or more search scope indicators of said history indicator area of said query window represents a search scope at a level in said search path.

3. The computer controlled display system as recited in claim 2 wherein one of said one or more search scope indicators of said history indicator area is highlighted to indicate the search scope being displayed.

4. The computer controlled display system as recited in claim 2 wherein two or more of said search scope indicators of said history indicator area are highlighted to indicate search scopes being displayed.

5. The computer controlled display system as recited in claim 2 wherein each of said one or more search scope indicators of said history indicator area is an icon.

6. The computer controlled display system as recited in claim 2 wherein each of said one or more search scope indicators of said history indicator area is one or more text symbols.

7. The computer controlled display system as recited in claim 1 wherein said information visualization technique is a venn diagram wherein each circle corresponds to one of said one or more expressions of said query and the spatial locations and overlaps of said circles define a plurality of selectable areas.

8. The computer controlled display system as recited in claim 7 wherein said means for defining a search scope is comprised of means for selecting one or more areas in said venn diagram.

9. The computer controlled display system as recited in claim 1 wherein said information visualization technique is a perspective wall.

10. The computer controlled display system as recited in claim 9 wherein said means for defining a search scope is comprised of means for selecting a first point on said wall and a second point on said wall.

11. The computer controlled display system as recited in claim 1 further comprising means for displaying a search path, said search path comprised of a plurality of query windows which are concentrically displayed so that the history indicator area for each query window is displayed.

12. The computer controlled display system as recited in claim 1 wherein said displays means is further for displaying a history window, said history window for displaying a history structure of a search history of said search for documents stored in said database.

13. The computer controlled display system as recited in claim 12 further comprising means for adding a node to said history structure in response to definition of a search scope.

14. The computer controlled display system as recited in claim 1 wherein said means for defining a search scope is comprised of means for selecting one or more of said plurality of selectable disjoint subsets in said query result area.

15. On a computer system having a display means and coupled to a database, a method for displaying the results of a query to said database on said display means, said method comprising the steps of:

a) displaying a first query window having a first search scope, said first query window having a query entry area, a results display area and a history indicator area;

b) executing a provided query from a user, said query comprised of a plurality of expressions entered in to said query entry area of said first query window;

c) displaying an information visualization of the set of results of said query in said results display area of said first query window, said information visualization displaying a plurality of selectable disjoint subsets;

d) determining that said user has selected one or more of said selectable disjoint subsets;

e) creating a second query window having a second search scope comprised of said selected one or more disjoint subsets, said query window having a query entry area, a results display area and a history indicator area; and f) displaying said second query window concentric with said first query window so that the history indicator area of said first query window and the history indicator area of said second query window are concurrently displayed.

16. The method as recited in claim 15 wherein concurrent with step a), performing the step of creating a first node in a hierarchical history structure.

17. The method as recited in claim 16 wherein concurrent with step e), performing the step of creating a second node in a hierarchical history structure.

18. The method as recited in claim 17 wherein said method is further comprised of the steps:

g) detecting that said user has requested viewing of a history window, said history window for displaying said hierarchical history structure; and h) displaying said history structure in a history window.

* * * * *